July 25, 1950            H. R. OLTZ            2,516,527
BULKHEAD DOOR FOR FREIGHT VEHICLES
Filed April 14, 1947            3 Sheets-Sheet 1
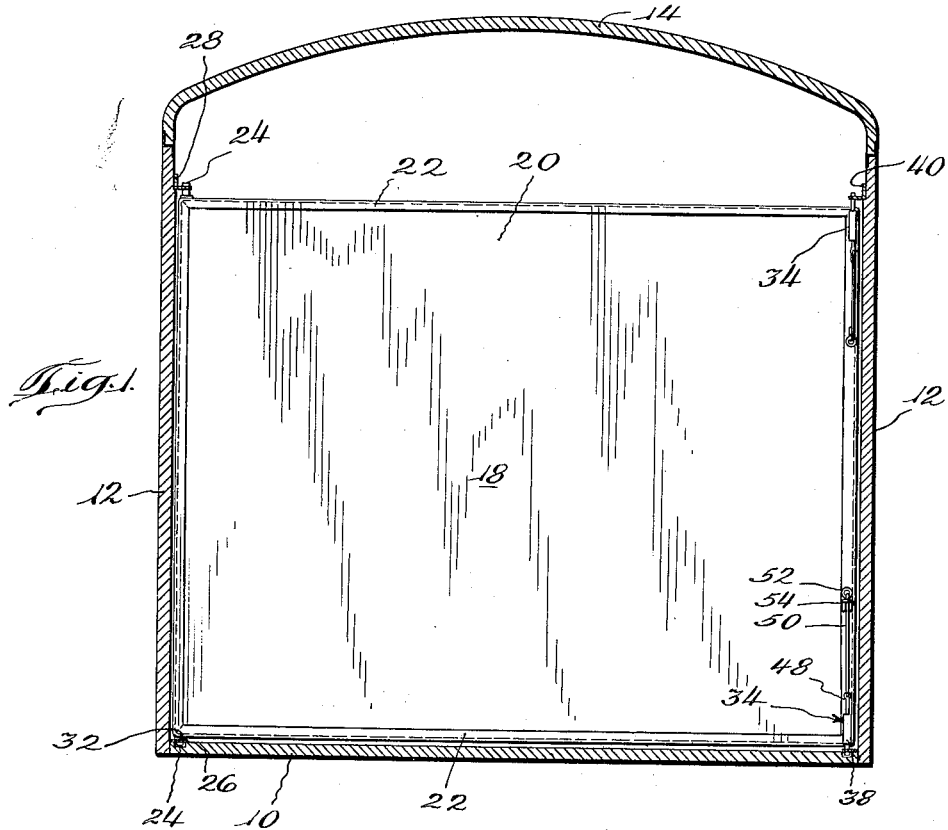
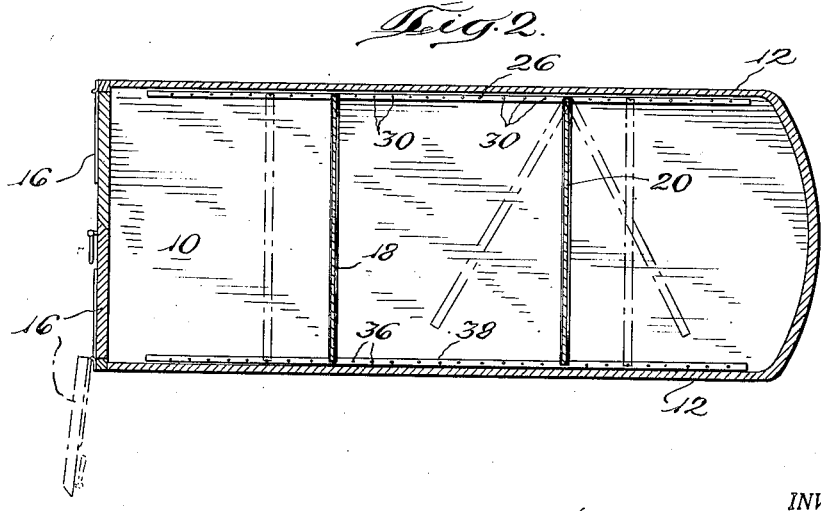
INVENTOR.
Howard R. Oltz July 25, 1950  H. R. OLTZ  2,516,527
BULKHEAD DOOR FOR FREIGHT VEHICLES
Filed April 14, 1947  3 Sheets-Sheet 2
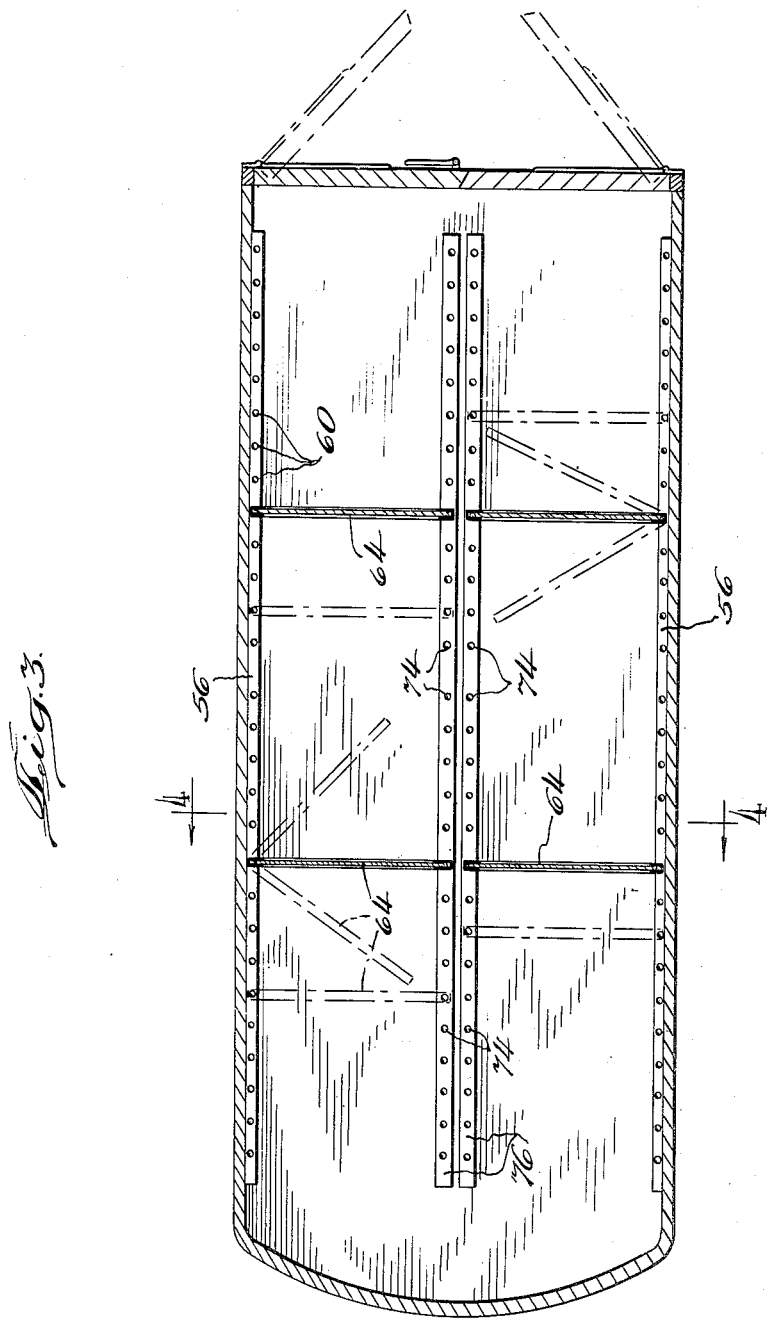
INVENTOR.
Howard R. Oltz
By
Hinkle, Horton, Ellenberg, Hausmann & Krupp
Attorneys July 25, 1950 
H. R. OLTZ 
2,516,527
BULKHEAD DOOR FOR FREIGHT VEHICLES
Filed April 14, 1947
3 Sheets-Sheet 3
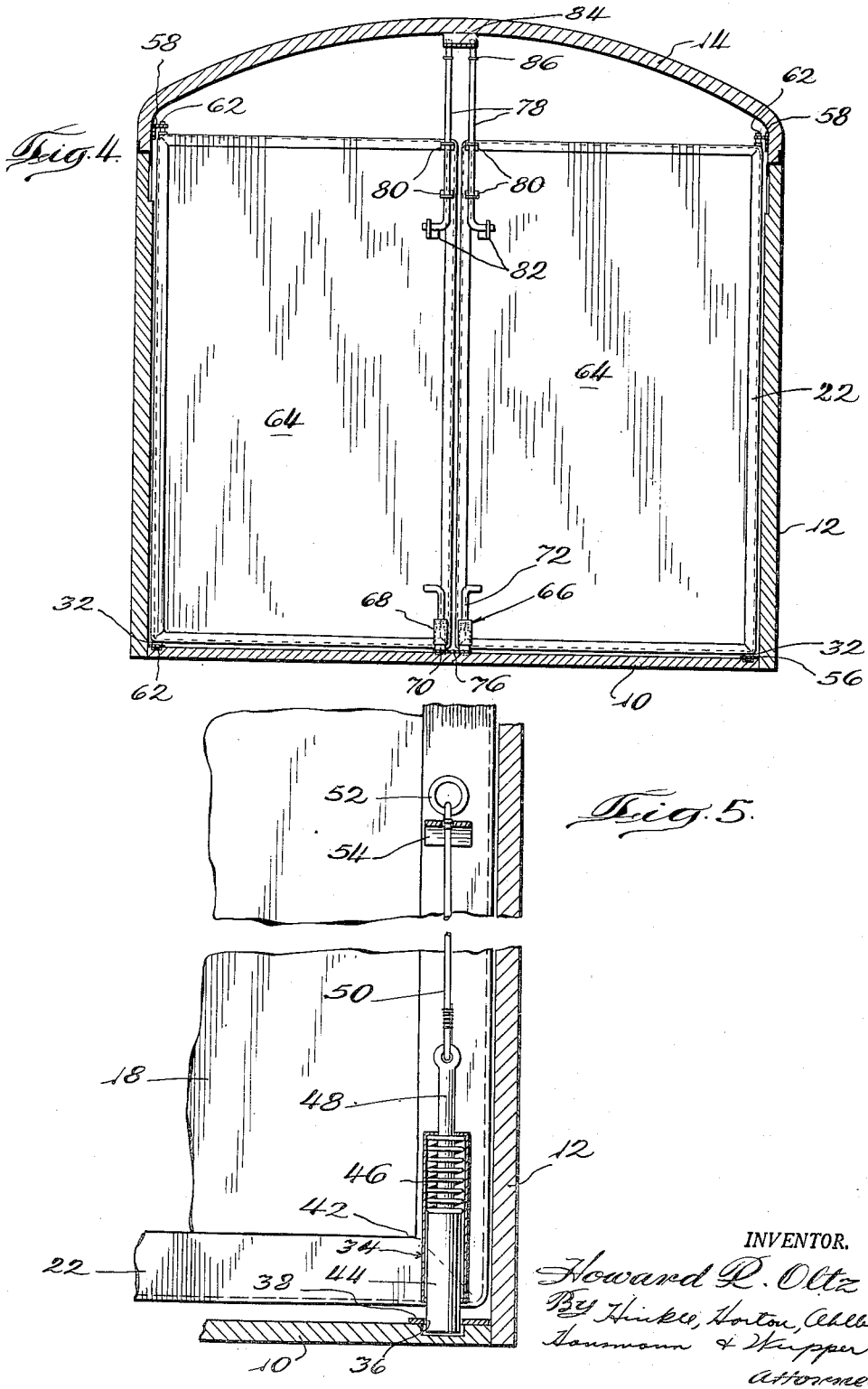
INVENTOR.
Howard R. Oltz Patented July 25, 1950

2,516,527

UNITED STATES PATENT OFFICE 2,516,527

BULKHEAD DOOR FOR FREIGHT VEHICLES

Howard R. Oltz, Hammond, Ind.

Application April 14, 1947, Serial No. 741,315

8 Claims. (Cl. 105—376)

The present invention relates to bulkhead or partitioning doors for freight vehicles, and more particularly to a door of this type for motor trucks or trailers which may be readily shifted longitudinally of the vehicle body to adapt the door to partitioning loads of various sizes.

The full load of a commercial freight carrying vehicle such as a motor truck quite frequently consists of freight of several different kinds or of freight consigned to different consignees. Heretofore, it had been recognized that some means of dividing the full load to separate the various kinds of freight or the freight going to different consignees was desirable, and attempts were made to devise a bulkhead or partitioning door suitable for this purpose. These doors all had certain disadvantages which limited their use. For example, most of these doors, if they were shiftable at all, were relatively awkward to shift along the interior of the vehicle body to adapt the body to loads of different sizes. In addition, most of these doors were designed for use in freight cars where the weight of such a door is a minor consideration. However, weight of accessories is a very important factor in motor trucks because of the relatively small weight that they carry, and for this reason the bulkhead doors of the prior art which are designed for freight cars are unsuitable for use on trucks.

The bulkhead door of the present invention eliminates all of these disadvantages and in addition it is so constructed and mounted that it may be readily shifted to any desired position with respect to the vehicle body to take care of loads of different sizes. A further advantage arises from the fact that the door and its support are so constructed that the door may be mounted to pivot from either side of the vehicle body without altering the construction of the same. In addition to all these features, the door may be made sufficiently light in weight so that it is adapted for use on motor trucks or trailers, may be quickly installed on such vehicles, and has a mounting structure which does not interfere with the loading or placement of the load in the body of the vehicle.

Accordingly, a primary object of the invention is the provision of a generally improved bulkhead or partitioning door for segregating freight in a freight vehicle, such as a motor truck, into less than carload lots, which is sufficiently light in weight so that it may be used on motor trucks or trailers and is so constructed that it may be readily installed on trucks or trailers of conventional construction, or may be incorporated into new constructions at very little added cost in either case.

Another object of the invention is the provision of a new and improved partitioning door construction particularly adapted for truck and trailer bodies which occupies little space in the vehicle body and has no projecting parts likely to interfere with the loading of the vehicle, placement of the load, or which might cause damage to the freight carried.

A further object of the invention is the provision of a new and improved partitioning door so constructed that it may be readily mounted in the vehicle or dismounted therefrom at any desired position in the vehicle, so that the door may be shifted along the length of the vehicle body to accommodate loads of various sizes.

A still further object of the invention is the provision of a partitioning door for freight vehicles, including pivot receiving supporting members and latch receiving members on opposite sides of the vehicle of symmetrical construction so that the door can be pivoted from either side of the truck, as desired.

A more specific object of the invention is the provision of a partitioning door construction for freight vehicles which may be incorporated in a single door construction of sufficient width to span the width of a freight vehicle body, or may be incorporated in a double-door construction, the two doors together spanning the width of the vehicle body, and, in addition, being adapted to be mounted in staggered relation so that loads of different length may be carried on the two sides of the vehicle.

These and other objects of the invention will become apparent from the following description in conjunction with the accompanying drawings, in which:

Fig. 1 is a vertical sectional view through the body of a motor trailer in which a single bulkhead door constructed in accordance with the present invention is incorporated;

Fig. 2 is a horizontal sectional view through the body of a motor trailer showing a pair of single doors of the present invention secured in position in the trailer body;

Fig. 3 is a longitudinal sectional view through a trailer body similar to Fig. 2 but showing the double-door construction of the present invention;

Fig. 4 is a vertical sectional view through a motor trailer body similar to Fig. 1 but showing the double-door construction of the present invention; and Fig. 5 is a fragmentary cross-sectional view on an enlarged scale showing one of the door latches used with the bulkhead doors of the present invention.

Referring first to Figs. 1 and 2 which illustrate the single door construction, a trailer body of conventional construction is there shown more or less diagrammatically. This body has a floor 10 which may be of wood, side walls 12 of wood, sheet metal or other suitable material conventionally assembled, and an arch-shaped roof 14 extending from the side walls. In Fig. 2 the rear end of the trailer is shown provided with a pair of end gates or door 16 hinged to the side walls 12 so that the doors may be opened as indicated in phantom.

The partitioning or bulkhead door 18 has a body panel 20 which may be formed from plywood or from corrugated sheet metal set in and secured to channel members 22 which form the peripheral edges of the door. These channel members are preferably formed from aluminum alloy to reduce the total weight of the door and, if necessary, the door may be strengthened by means of vertically and horizontally extending reinforcing strips (not shown) of angle or channel shape secured at opposite ends to the flanges of the channel members 22. If desired, the peripheral edges of the door could of course be made from angle strips with the body panels set against and secured to the vertical webs of these angle strips.

Hinge pintles 24 are secured to the upper and lower edges of the door adjacent one side thereof, as shown in Fig. 1, the upper pintle being at least double the length of the lower pintle for a purpose which will appear hereinafter.

The door is secured in the vehicle body by supporting means including a rail or plate 26 bolted to the floor of the vehicle adjacent one side wall 12 and an angle strip 28 secured to this side wall 12 adjacent the top thereof. This plate and angle strip extend longitudinally of the vehicle body as shown in Fig. 2 and are provided with a series of vertically aligned pivot receiving apertures 30 for receiving the pintles 24. Preferably, the floor 10 of the vehicle is provided with cylindrical recesses in line with the apertures 30 in the plate 26 so that the lower pintle may be made sufficiently long to extend through the rail 26 and into the cylindrical recess, thus securely anchoring the lower end of the door. The angle strip 28 is secured by suitable means such as bolts at a position adjacent the top of the side wall 12 and elevated above the top edge of the door a distance equal to at least the length of the lower pintle so that the door may be readily hung or dismounted. This is done by manipulating the door to bring the longer upper pintle 24 into engagement with an aperture 30 in the angle strip 28 at the position where it is desired to hang the door and then raising the door and aligning the lower pintle with the proper aperture 30 in the plate 26, whereupon the door may be released to allow the lower pintle to engage in the aperture 30 in the rail and the recess thereunder. Because of the relative length of the upper pintle as compared to the lower, it will remain engaged in the aperture in the angle strip 28 and the door will thus be pivotally secured to the side wall of the vehicle body so that it may be swung as indicated in phantom in Fig. 2. A washer 32, or enlargement, is preferably provided on the lower pintle interposed between the bottom edge of the door and the top surface of the rail 26 to support the door slightly elevated from the floor and permit easy swinging movement thereof.

The door is locked in position by means of latch bolts 34 adjacent the upper and lower edges of the door on the side opposite the pivoted side, as indicated in Fig. 1. These bolts engage in aligned apertures 36 in a rail 38 bolted to the floor of the vehicle and an angle strip 40 bolted to the side wall. In accordance with one of the features of the invention, this rail 38 and angle strip 40 and the apertures 36 therein correspond in every respect with the rail 26 and strip 28 to which the door is pivoted and are similarly positioned. As a result, the door 18 may be pivoted from either side of the vehicle body.

As seen in Fig. 5, each latch 34 includes a tubular housing 42 secured to the side wall of the door 18. A latch bolt 44 is reciprocable in this housing and is urged outwardly thereof by compression spring 46. A stem 48 secured to the upper end of the latch bolt projects from the housing 42 and has a pull chain or cord 50 secured to its upper end. This cord is provided with a ring 52 on its free end for grasping, and this ring engages a bracket 54 on the side wall of the door for limiting outward movement of the latch bolt. By pulling on the ring and cord of the upper and lower latches, they can be retracted sufficiently to disengage the apertures 36 so that the door may be swung on its pintles 24.

Referring to Figs. 3 and 4 which show the double-door construction, it will be noted that these doors are pivotally secured to the side walls 12 of a vehicle body in a manner similar to that in which a single door is hung. In this form of the invention, longitudinally extending symmetrical plates 56 are bolted to the floor adjacent the side walls of the vehicle and longitudinally extending symmetrical angle pieces 58 are bolted to each side wall 12 positioned somewhat above the height of the doors. These plates and angle pieces have aligned apertures 60 and the floor below the apertures in the plates is recessed to receive the ends of the lower pintles on the doors. Pintles 62 are secured on the upper and lower edges of each of the doors adjacent one side of the doors and the upper pintles are longer than the lower pintles for the purpose explained in connection with the single door construction.

The two doors 64 are each similar in construction to the single door and are of a width approximately one-half the width of the vehicle body, as shown in Fig. 4, so that together they may be used to segregate or divide the space in the vehicle into compartments. These doors are placed in position and shifted from one position to another in the same manner as the single door previously described. They may be positioned so that they are aligned as shown in full lines in Fig. 3, or they may be placed in staggered relation as shown in phantom in the same figure, so that loads of different lengths may be carried on the two sides of the vehicle.

Latches are secured on the free ends of the doors for locking these ends in position. These latches may be of the same type described for use with the single door but a modified latch is shown. The lower latches 66 each consist of a tubular housing 68 secured on the door in which a spring-pressed latch bolt 70 is housed. A pull rod 72 secured to the latch bolt projects vertically from the housing and is bent over at its upper end so that it may be readily grasped when it is desired to raise the latch against the pressure of the spring which urges it to locking position. The ends of these latch bolts engage in apertures 74 in a longitudinally extending locking plate 76 bolted to the floor of the vehicle so that the apertures 74 are aligned with the latch bolts. Two plates 76 may be used as shown in Fig. 3, or in the alternative one plate provided with two rows of apertures. These apertures, it will be noted, are aligned in a transverse direction with the apertures in the plates 56 and angle pieces 58 which support the doors.

The latches for the upper ends of the doors are in the form of an elongated rod 78 extending vertically upwardly from the top edge of the door and slidably supported in aligned angle brackets 80 secured to the door. The lower ends of these rods are bent outwardly and the latch is held in locking position by latch brackets 82 having notched upper edges in which the bent-over ends of the latches seat to support the same in locking position. These brackets may be secured to the sides of the doors by any suitable means.

The upper ends of the latches engage in apertures in a longitudinally extending center plate 84 secured to the inside of the roof of the vehicle. To unlock a latch, it is raised until the bent-over end is above the level of the notch in the latch bracket 82 and the latch is then turned until the bent-over end clears the bracket 82. The latch then may be allowed to drop and it will be prevented from falling through the brackets 80 by an enlargement 86 adjacent the upper end of the latch. When the invention is to be applied to a new construction, the floor of the vehicle may be recessed to receive the rails 26, 56, and 76, so that a level floor is presented to the load. Preferably, the heads of the bolts or screws used to secure the rails and plates to the floor are countersunk so that nothing projects above the level of the floor. It will thus be seen that I have provided a simple and sturdy bulkhead door construction which may be readily installed in the bodies of conventional trucks and trailers at a small expense. Moreover, the construction is such that the doors may be readily placed in position or removed so that little labor is entailed in shifting their position and they may swing from either side wall of the vehicle body. A further advantage arises from the fact that the structure for supporting the doors does not interfere with the loading of the vehicle or with the placement of the load and is not likely to cause damage to the load during transit.

While there is shown and described herein certain structure illustrating the invention, it is to be understood that the invention is not limited thereto or thereby but may assume numerous other forms and includes all modifications, variations and equivalents coming within the scope of the following claims.

I claim:

1. In a freight vehicle having a floor and side walls, the combination comprising top and bottom supporting structure located adjacent at least one of the side walls of said vehicle and including top and bottom horizontal portions disposed inwardly from said side walls, said horizontal portions having a series of vertically aligned apertures, one or more bulkhead doors, means for securing a door to said supporting structure at any desired position longitudinally of the vehicle for free pivotal movement relative thereto including pivot pintles adjacent one edge of the door adapted to be received in any pair of aligned apertures in said top and bottom supporting structure, and means for latching said bulkhead door against swinging movement on said pintles releasably to lock the same in operative transversely disposed relation to the body of the vehicle.

2. In a freight vehicle having a floor and side walls, the combination comprising top and bottom supporting structure located adjacent both of the side walls of said vehicle and including top and bottom horizontal portions disposed inwardly from said side walls, said horizontal portions having a series of vertically aligned apertures, one or more bulkhead doors, means for securing a door to the supporting structure on either side of said vehicle at any desired position longitudinally of the vehicle for free pivotal movement relative thereto including pivot pintles adjacent one edge of the door adapted to be received in any pair of aligned apertures in said top and bottom supporting structure, and means for latching said bulkhead door against swinging movement on said pintles when the door is disposed transversely of the vehicle.

3. In a freight vehicle having a floor and side walls, the combination comprising top and bottom supporting structure located adjacent at least one of said side walls and disposed horizontally inwardly therefrom, said structure having a series of vertically aligned apertures, one or more bulkhead doors, means for securing a door to said supporting structure at any desired position longitudinally of the vehicle for free pivotal movement relative thereto including upper and lower pivot pintles adjacent one edge of the door adapted to be received in any pair of aligned apertures in said top and bottom supporting structure, said upper pintle having a length exceeding that of the lower by an amount equal at least to the effective length of the lower pintle and said top and bottom supporting structures being spaced from each other less than the distance between the ends of said pintles, and means for latching said door against swinging movement on said pintles to lock the door in transversely disposed relation to the vehicle.

4. In a freight vehicle having a floor and side walls, the combination comprising top and bottom supporting structure located adjacent both of the side walls and including top and bottom portions disposed horizontally inwardly from said side walls, said top and bottom horizontal portions having a series of vertically aligned apertures, a bulkhead door having a width approximating the internal width of said vehicle body, means for securing the door to the supporting structure on either side of said vehicle at any desired position longitudinally of the vehicle for free pivotal movement relative thereto including pivot pintles adjacent one edge of the door adapted to be received in any pair of aligned apertures in said top and bottom supporting structure, and latching means adjacent the side of said bulkhead door opposite said pintles, said latching means being adapted to be engaged with the apertures in the supporting structure on the side of said vehicle opposite that from which the door is hung to prevent swinging movement of the door on said pintles.

5. In a freight vehicle having a floor and side walls, the combination comprising top and bottom supporting structure located adjacent both of the side walls and including top and bottom portions disposed horizontally inwardly from said side walls, said horizontal portions having a series of vertically aligned apertures, one or more bulkhead doors having a width approximating the internal width of said vehicle body, means for securing a door to said supporting structure at any desired position longitudinally of the vehicle for free pivotal movement relative thereto including upper and lower pivot pintles adjacent one edge of the door adapted to be received in any pair of aligned apertures in the top and bottom supporting structure on either side of said vehicle, said upper pintle having a length exceeding that of the lower by an amount equal at least to the effective length of the lower pintle and said top and bottom horizontal portions of the supporting structures being spaced from each other less than the distance between the ends of said pintles and latching means on the side of said bulkhead door opposite said pintles, said latching means being adapted to be engaged with the apertures in the supporting structure on the side of said vehicle opposite that from which the door is hung to prevent swinging movement of the door on said pintles.

6. In a freight vehicle having a floor and side walls the combination comprising upper and lower supporting members adjacent the tops and bottoms of both of said side walls including portions disposed horizontally inwardly of said side walls, the horizontal portions of said top and bottom members having a series of vertically aligned longitudinally spaced pivot receiving apertures, the vertically aligned pairs of apertures in the supporting members on one side wall being transversely aligned with the vertically aligned pairs of apertures in the supporting members on the opposite side wall, one or more bulkhead doors, means for pivotally securing a door to said vehicle including upper and lower pivot pintles adjacent one side of said door adapted to be engaged with any aligned pair of apertures in the top and bottom supporting members on either one of the sides of said vehicle, and top and bottom latching means adjacent the side of said bulkhead door opposite said pintles, said latching means being adapted to be engaged with the vertcially aligned pair of apertures on the side of said vehicle opposite that on which the door is hung which are transversely aligned with the pair of apertures in which said pintles are engaged to prevent swinging movement of the door on said pintles.

7. In a freight vehicle having a floor and side walls, the combination comprising top and bottom supporting structure including top and bottom horizontal portions disposed inwardly from each of said side walls, said top and bottom horizontally disposed portions having a series of vertically aligned apertures, one or more bulkhead doors for each side of said vehicle of approximately half the internal width of said vehicle body, upper and lower pivot pintles adjacent one side of said doors adapted to engage in any pair of aligned apertures in said supporting structure to adapt said doors to be pivotally secured to either side of said vehicle with the doors on one side disposed in aligned or staggered relation relative to the doors on the other side, and cooperating latch means on said doors and said vehicle body to lock said doors against swinging movement on said pintles when the doors are disposed transversely of the vehicles.

8. In a freight vehicle having a floor and side walls, the combination comprising top and bottom supporting means including vertically aligned top and bottom pivot receiving structure disposed inwardly of each of said side walls in spaced relation longitudinally of said supporting means, one or more bulkhead doors for each side of said vehicle having a width approximately one-half of the width of said vehicle body in a transverse direction, upper and lower pivot pintles on each side of each of said doors adapted to be freely received in any of the vertically aligned pivot receiving structure on either side of said vehicle to adapt said doors for securement to either side of the vehicle, latch means adjacent the sides of said doors opposite said pivot pintles, and top and bottom latch receiving means located adjacent the longitudinal center line of said vehicle body for receiving said latching means to prevent swinging movement of said doors on said pintles.

HOWARD R. OLTZ.

REFERENCES CITED

The following references are of record in the file of this patent:

UNITED STATES PATENTS

| Number | Name | Date |
|---|---|---|
| 898,647 | Herr | Sept. 15, 1908 |
| 1,327,634 | Short | Jan. 13, 1920 |
| 1,605,822 | Eldridge | Nov. 2, 1926 |
| 2,155,463 | Angell | Apr. 25, 1939 |

FOREIGN PATENTS

| Number | Country | Date |
|---|---|---|
| 63,067 | Switzerland | Dec. 14, 1912 |